(12) United States Patent
Le

(10) Patent No.: US 7,471,959 B2
(45) Date of Patent: Dec. 30, 2008

(54) STATUS REQUEST MESSAGES FOR USE ON A MOBILE HANDSET

(75) Inventor: Tommy Le, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 477 days.

(21) Appl. No.: 10/928,546

(22) Filed: Aug. 26, 2004

(65) Prior Publication Data

US 2006/0046751 A1 Mar. 2, 2006

(51) Int. Cl.
*H04Q 7/20* (2006.01)
(52) U.S. Cl. .................... 455/466; 455/423; 455/412.2; 455/566
(58) Field of Classification Search .......... 455/423, 455/466, 412.2, 566
See application file for complete search history.

(56) References Cited

U.S. PATENT DOCUMENTS

| | | | |
|---|---|---|---|
| 5,826,062 A | * | 10/1998 | Fake et al. .................. 715/513 |
| 7,016,672 B1 | * | 3/2006 | Lipsit ......................... 455/425 |
| 2003/0036395 A1 | * | 2/2003 | Proidl ......................... 455/466 |
| 2004/0058652 A1 | * | 3/2004 | McGregor et al. ....... 455/67.13 |

\* cited by examiner

*Primary Examiner*—Nghi H Ly

(57) ABSTRACT

An efficient way to communicate with a mobile handset for testing and debugging is described. The communication process can also be used to make updates to the mobile handset. Data from a mobile handset can be analyzed. This data may include, for example, information relating to the performance of the mobile handset or information related to errors that have occurred on the mobile handset. Additionally, data relating to battery performance, performance statistics, error logs, standby and talk time may also be analyzed. A request is encoded and transmitted to a mobile handset. The encoded request is received at the mobile handset and a message responsive to the encoded request is transmitted. The encoded response is received and decoded. The encoded messages, both the encoded request and the message responsive to the request are communicated as a text message.

21 Claims, 11 Drawing Sheets

STATUS REQUEST MESSAGES FOR USE ON A MOBILE HANDSET

FIELD

The present invention relates to electronic devices, and more particularly to wireless communication devices.

BACKGROUND

Mobile handsets have become ubiquitous in many industrialized nations. Many people carry and use mobile handsets. Additionally, many of those users upgrade mobile handsets often. For many, especially younger users, the mobile handset that they carry makes a fashion statement. Many users want new "cool" phones with new "cool" features.

With that in mind it is becoming increasingly important for mobile handset manufacturers to be able to develop mobile handsets quickly. Additionally, and possibly more importantly, it is becoming important to be able to upgrade mobile handsets quickly and efficiently.

As stated above, many users want new, exciting features and are willing to upgrade mobile handsets to get it. If a manufacturer can make a mobile handset that can be efficiently upgraded it may be less likely that a user will change mobile handsets to a competitors product. Additionally, a user may chose that manufacturers product if they know that new features can be added latter.

Many mobile handsets have needed to be upgraded by returning to a store or sending back to the manufacturer. This is an expensive and annoying way to upgrade a mobile handset.

While some methods of over-the-air software download exist, many require data calls that are intrusive for the user. It is advantageous to use ways of upgrading mobile handsets that is invisible to the user. In some cases the upgrade would be made without the user having to request the upgrade. In other cases a user may request a particular upgrade, but if a way could be found that did not use a data call then the users mobile handset would not be unusable while in the data call.

In addition to over the air forms of upgrading software, as stated above, it is important for mobile handset manufacturers to be able to design new mobile handsets quickly. Part of that design process is testing and debugging. If the efficiency of the testing and debugging process can be increased then typically a manufacturer will be able to sell new mobile handsets to the consumer more quickly. Additionally, if the testing and debugging process can be made more efficient a manufacturer may be able to increase the number of different mobile handsets offered while continuing to employ the same number of mobile handset designers. A way to efficiently upgrade mobile handsets, as well as efficiently testing and debugging mobile handsets would be advantageous.

SUMMARY

An efficient way to communication with a mobile handset for testing and debugging is an important feature. Additionally, if that communication process can also be used to make updates to the mobile handset the handset can generally be updated less expensively than if the mobile handset must be recalled for an upgrade.

Sometimes, when testing a mobile handset it is important to analyze data from the mobile handset. This data may include, for example, information relating to the performance of the mobile handset or information related to errors that have occurred on the mobile handset. Additionally, data relating to battery performance, standby and talk time may also be required. It may also be necessary to reinitialize performance statistics and error logs so that new trends can be identified.

In many cases a cable is connected to the mobile handset to collect the data that is needed. The cable typically connects the mobile handset to a personal computer so that the data needed can be collected and analyzed on the personal computer. However, in many cases the data collected using the cable has been unreliable. One reason for this is that many mobile handsets have poor radio frequency (RF) performance when connected to the cable. In other words, sometimes, the cable interferes with the RF reception of the handset. In cases where the data that is collected is related to RF performance the data collected when the cable is attached may be nearly useless since the use of the cable is altering the data.

Additionally, in some cases it is not practical to connect the mobile handset to a computer with the cable. For example, the mobile handset may be in use by testers that are trying to use the mobile handset under realistic actual conditions. Many, if not most of these users would not want to carry a laptop around to gather data. It would be advantageous in this case and others to be able to gather data relating to performance, or other test data from the mobile handset with a minimal amount of interfering with normal operation of the mobile handset. As an additional example, if the mobile handset has been sold to a user and is already in the field, it is extremely expensive to recall the handset to upgrade.

Remote debugging and analysis allows a mobile handset to be monitored without the use of a cable connection. A request is encoded and transmitted to a mobile handset. The encoded request is received at the mobile handset and a message responsive to the encoded request is transmitted. The encoded response is received and decoded. The encoded messages, both the encoded request and the message responsive to the request are typically a string of ASCII text. The initial encoded request is normally generated by a personal computer, however, other generating devices are possible. Additionally, one way to send the messages is to use short messaging service. (SMS) Other methods are possible, for example, the encoded messages could be transferred using a data call. Alternatively, methods described in U.S. applications Ser. No. 09/916,900, filed Jul. 26, 2001; Ser. No. 09/916, 460, filed Jul. 26, 2001; Ser. No. 09/917,026, filed Jul. 26, 2001; Ser. No. 09/927,131, filed Aug. 10, 2001; or Ser. No. 09/969,305, filed Oct. 2, 2001. However, data calls and the other methods described can, in some cases, be more intrusive to the user of the mobile handset. U.S. applications Ser. Nos. 09/916,900; 09/916,460; 09/917,026; 09/927,131; and 09/969,305 are incorporated by reference.

A received encoded message responsive to a request would normally include the information that was requested by the request message. This may include, for example, information relating to the performance of the mobile handset or information related to errors that have occurred on the mobile handset. Additionally, data relating to battery performance, standby and talk time may also be required. In some cases the request message may request that performance statistics be reinitialized. In this case the mobile handset may send a confirmation. However, in other cases the mobile handset may simply re-initialize without sending a confirmation.

In one example a text message is use to send the request. A text message is encoded that contains a request. The text message is transmitted. A text message is received responsive to the request and the text message responsive to the request is decoded. In some cases no response may be required.

At the mobile handset a text message is received. The text message may contain an encoded request. The text message is processed. If it is a text message intended for a user, the message is displayed on the screen. Alternatively, displaying the message to the screen may be suppressed and the message passed to call processing. A text message containing a request may typically be transmitted in multiple steps. As an example, a text message containing a request may be transmitted to a base station. The base station then transmits the text message to the mobile handset that the message is intended for.

Determining data such as performance statistics using message formats such as SMS offers many advantages. In cases where the cable interferes with RF this interference would be eliminated. In some cases this may be the difference between useful data and useless data.

The use of remote debugging and analysis also allows data to be collected without connecting a cable and a personal computer to the mobile handset. This enables data to be collected while the mobile handset is still being used in the field. In some cases this may allow problems to be found and solved sooner and more efficiently. Additionally, in cases when used to modify mobile handsets in the field, changes can be made to mobile handsets without recalling the handsets. This can typically be used to greatly decrease the cost for some handset upgrades.

DETAILED DESCRIPTION OF THE PREFERRED EMBODIMENTS

Figure 1:
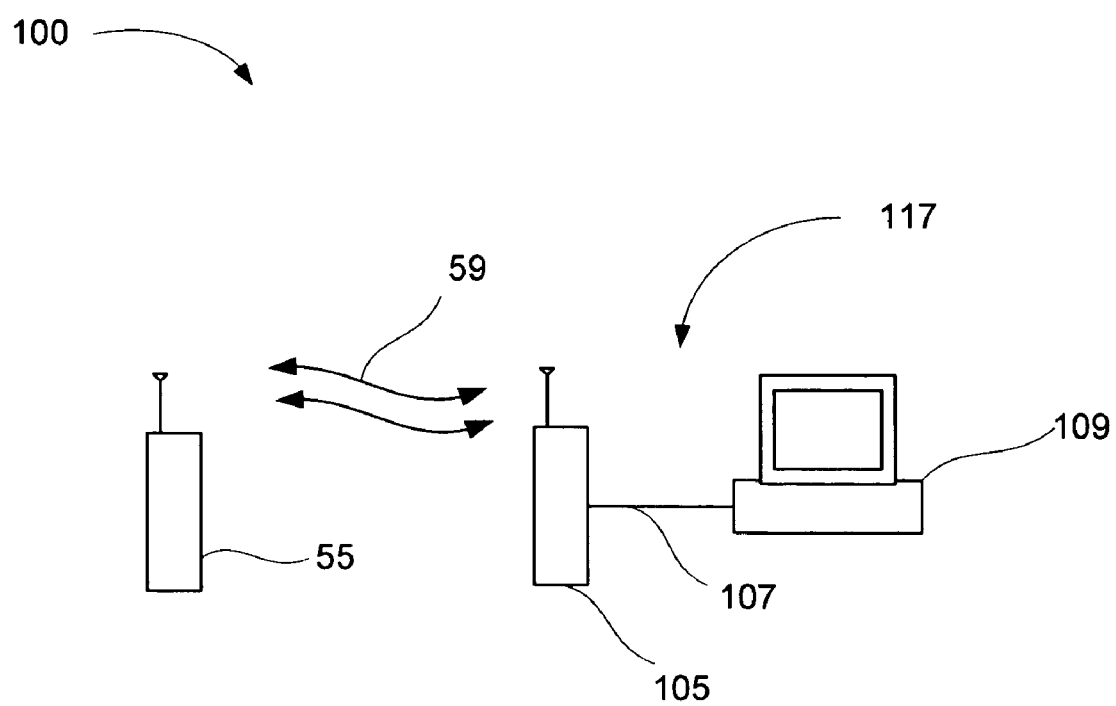
FIG. 1 is a diagram showing a mobile handset connected to a computer and communicating to a second mobile handset.

A diagram 100 will now be discussed with respect to FIG. 1. The diagram 100 includes a mobile communication device 105 connected to a computer 109 using a cable 107. The combination of devices 105, 107, 109 may also be referred to as the test setup 117. The computer 109 is able to send and receive information to the mobile handset 105 through the cable 107. Information needed by the second mobile communication handset 55 can then be transmitted from the first mobile handset 105 to the second mobile handset 55 over-the-air.

Figure 2:
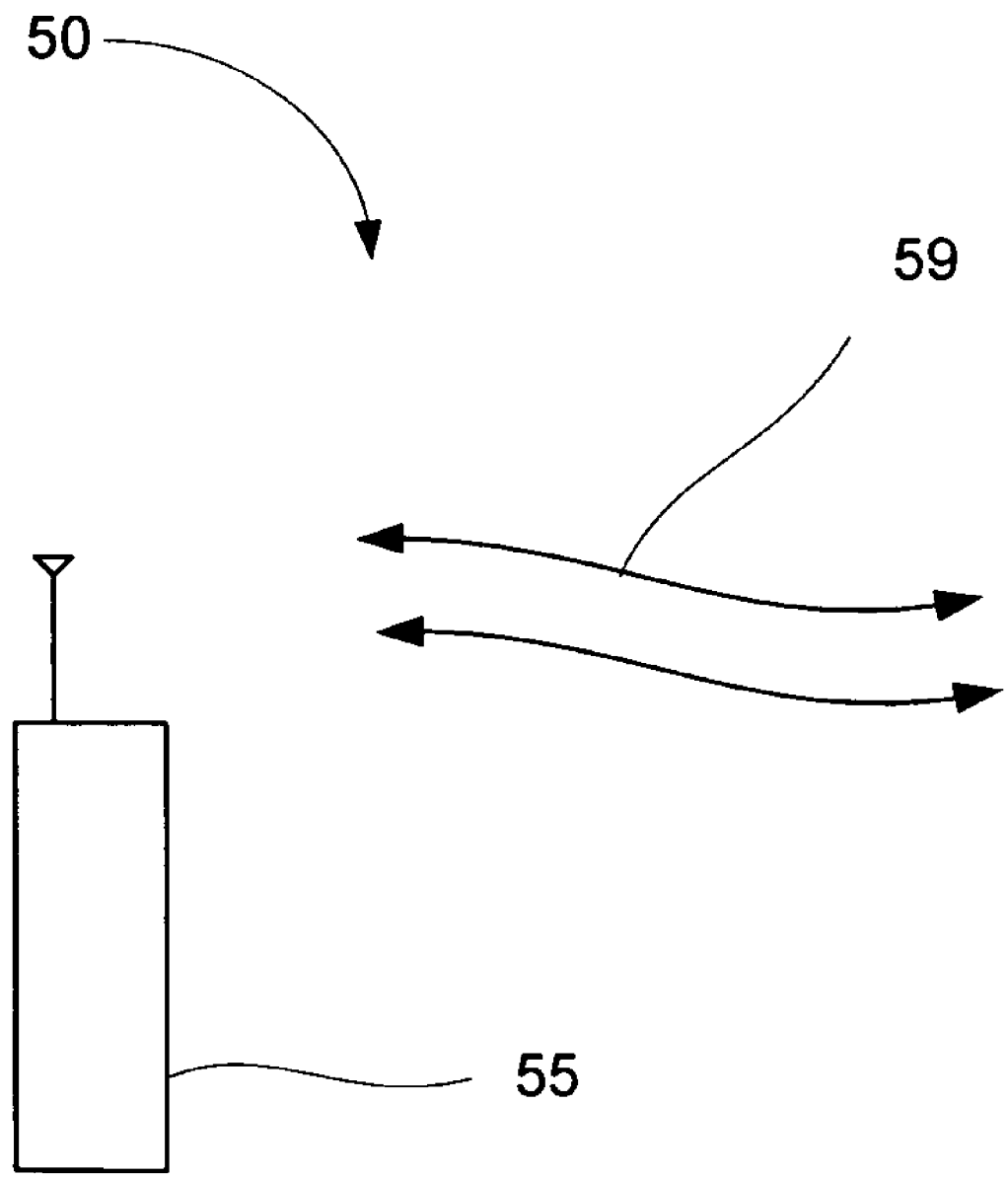
FIG. 2 is a diagram, showing a mobile handset.

Referring now to FIG. 2 a diagram 50, showing a mobile communication device in the form of a mobile handset 55. The mobile handset 55 is transmitting or receiving a message 59. The mobile handset 55 is the same or similar to the mobile handset 55 of FIG. 1. Possible internal workings of the mobile handset 55 will be discussed with respect to FIG. 3.

Figure 3:
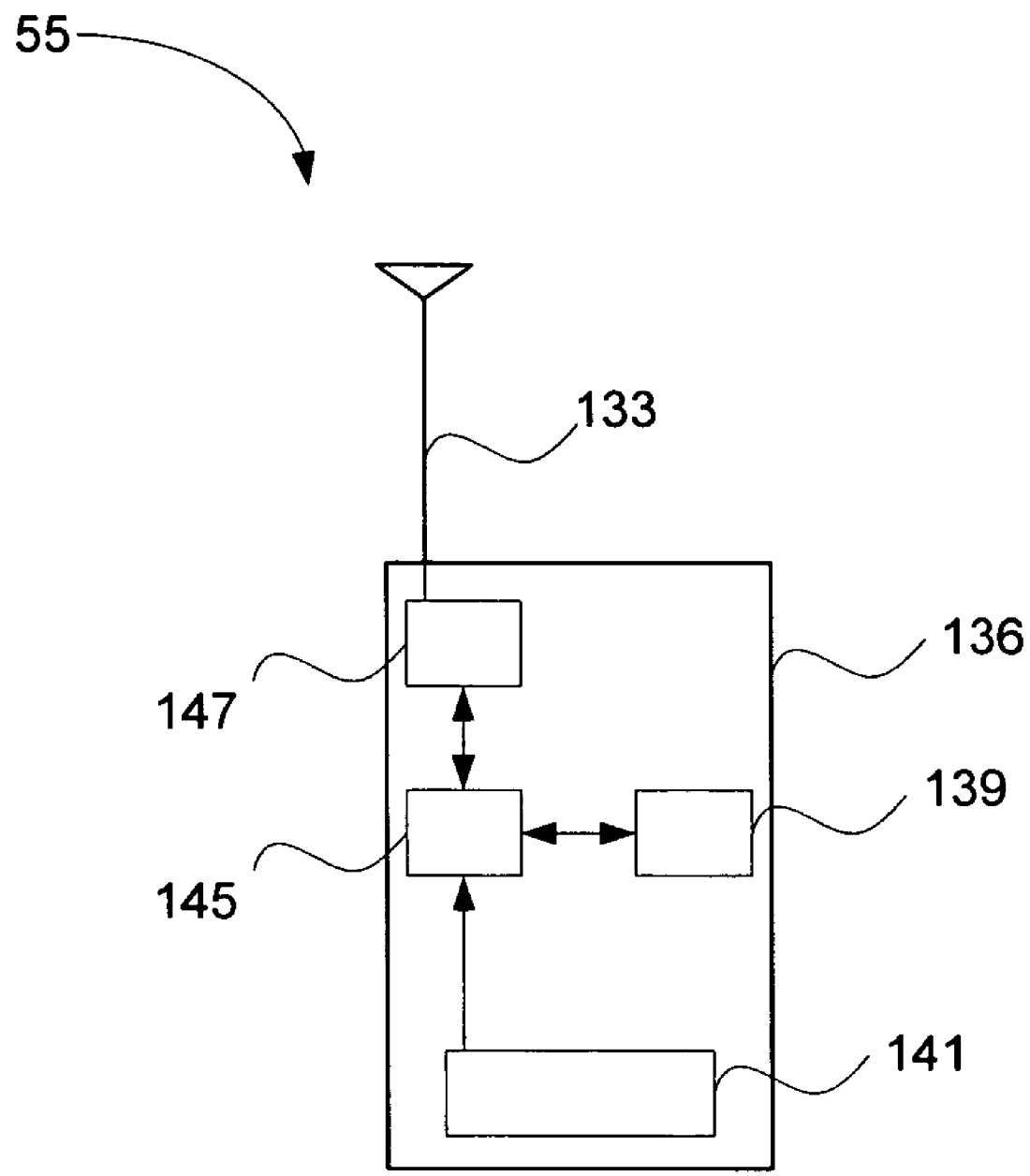
FIG. 3 is a diagram, showing more detail of a mobile handset.

FIG. 3 is a diagram showing more detail of a mobile handset 55. The mobile handset 55 includes an antenna 133. An antenna is a device that radiates or receives energy from its surroundings. The antenna is coupled to a transceiver 147. The transceiver 147 is a device that contains both a transmitter and a receiver. The transceiver 147 is connected to a processor 145 and capable of providing information to the processor 145. The processor is coupled to a memory 139. The memory 139 is configured to store data written by the processor 145, and capable of being read by the processor 145. A mobile power source in the form of a battery 141 is coupled to the processor 145 and provides power to the processor. The mobile power source could be other forms of transportable energy storage, such as, for example, a fuel cell.

A case 136 encloses the transceiver 147, the processor 145, the battery 141, and the memory 139. This is, however, only one possible example. Other examples are possible. For example, the antenna 133 could be an internal antenna placed within the case 136. Additionally, other components could be placed inside the case, for example, multiple antennas. As another example, a mobile handset could have an internal antenna and an external antenna. It will be clear to one of skill in the art that many configurations are possible. This is only one possible example of a mobile handset 55, other examples are possible.

Figure 4:
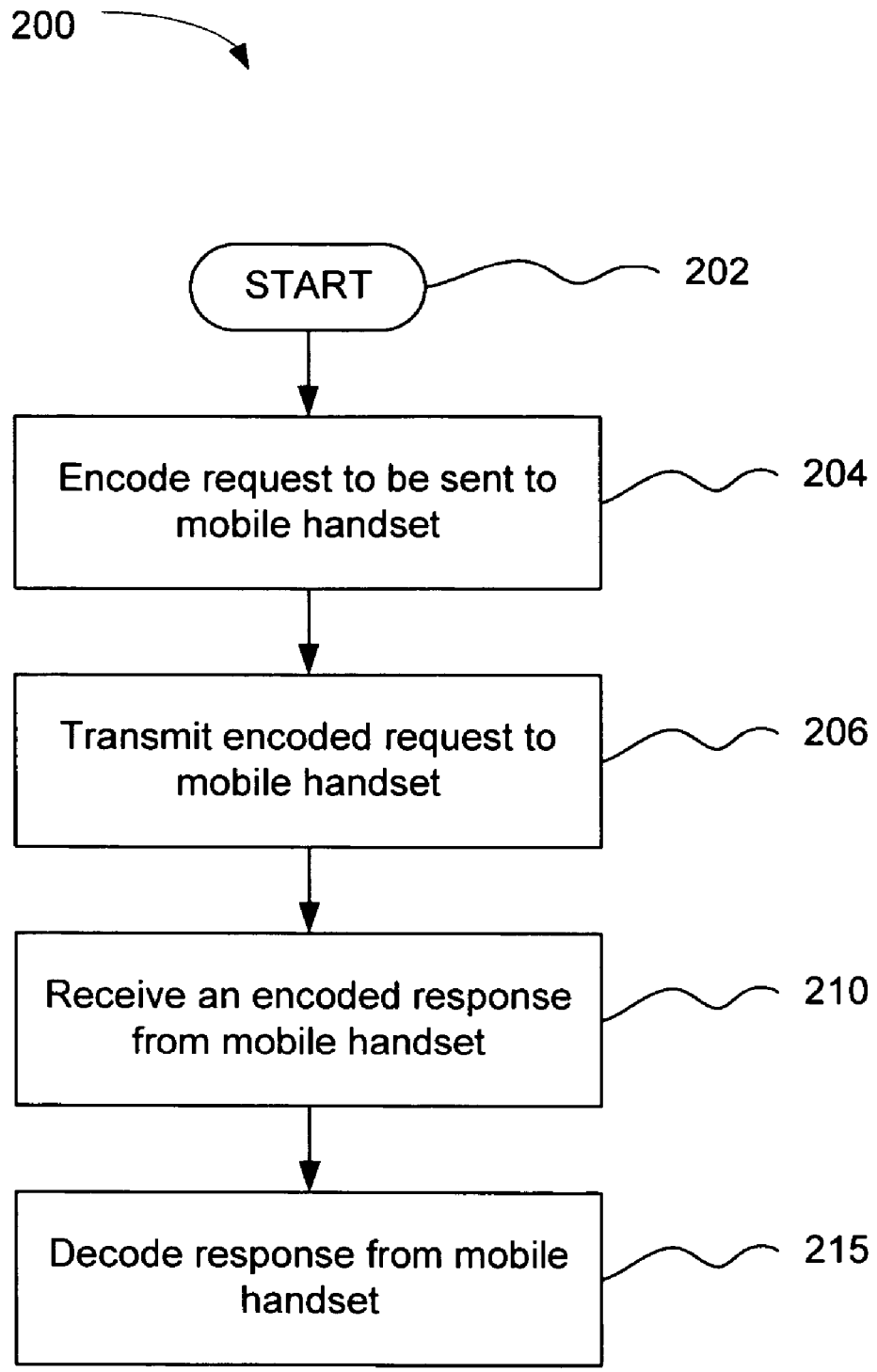
FIG. 4 is a flowchart.

FIG. 4 is a flowchart 200. The flowchart 200 begins at 202. During step 204 a request is encoded to be sent to the mobile handset. Note that this is the remote mobile handset, such as the mobile handset 55 of FIGS. 1 and 2. During step 206 the encoded request is transmitted to the remote mobile handset. The request is received at the remote mobile handset in step 210, and in step 215 a response to the request transmitted to the remote mobile handset is decoded. FIG. 2 describes an implementation from the perspective of devices such as the computer 109 and the mobile handset 105 shown on FIG. 2. The computer 109 and mobile handset perform the actions. Each of the steps 204, 206, 210, 215 occur either in the computer 109, or the mobile handset 105.

It should be pointed out that other devices could be developed to perform the same or similar function. For example, a computer could be developed with a built in transmitter to send and receive signals from an external mobile handset, such as the mobile handset 55 discussed with respect to FIGS. 1 and 2. Alternately, a mobile handset could be developed that contains enough processor capability to perform the functions a computer, such as the computer 109 shown in FIG. 2. For example, a mobile handset that also functions as a personal digital assistant (PDA) may be able to perform the functionality of the computer 109, cable 107, and mobile handset 105. Additionally, the exact device that performs any particular step may vary. As discussed above, it may be a single integrated device that performs the steps.

An advantage may includes the ability to upgrade or test mobile handsets using inexpensive equipment such as a computer 109 and a mobile handset 105. In some cases, other equipment may be used. One example includes the use of a PDA-mobile handset combination. While a PDA-mobile handset combination may in some cases be less expensive than a computer 109 mobile handset 105 combination, this may not always be the case. Additionally, in some cases it may be advantageous to use additional equipment, or other, possibly more expensive equipment. The scope should only be limited by the claims.

Figure 5:
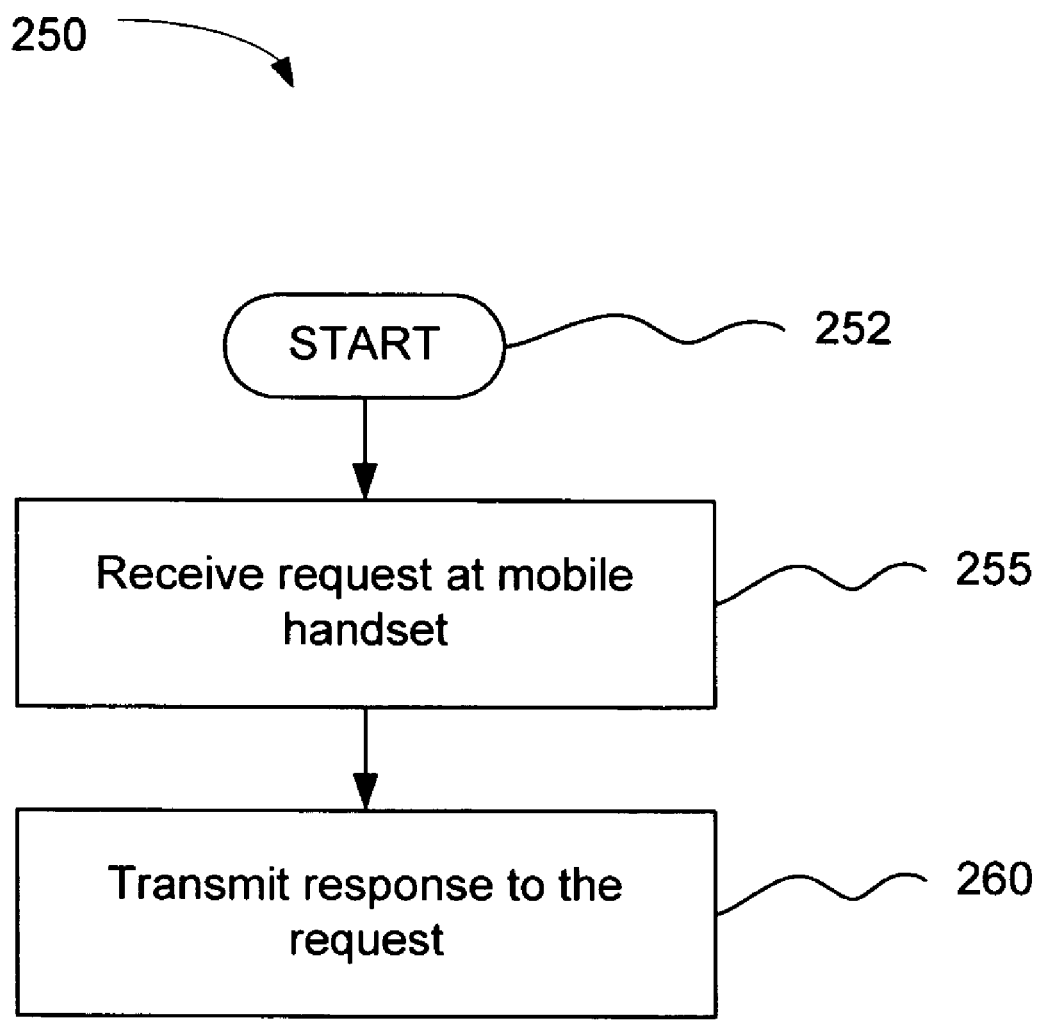
FIG. 5 is a flowchart.

FIG. 4 discussed an implementation with respect to a mobile handset 105 and computer 109 combination using a cable 107. Other possible implementations that take the place of the computer 109 mobile handset 107 combination were also discussed. In FIG. 5 a flowchart 250 will be discussed that shows an implementation from the perspective of the mobile handset 55 of FIGS. 1 and 2. The mobile handset 55 is the mobile handset that is not connected to the computer, referred to as the second mobile handset 55 in FIG. 2

Referring now to FIG. 5, the flowchart 250 begins at 252. In step 255 a request is received at the mobile handset 55. Again this is the mobile handset 55 of FIGS. 1 and 2. It may also be a mobile handset of the same or similar construction to the mobile handset 55. In some cases it may also be thought of as a mobile handset that is being tested, or a mobile handset that is being upgraded. These are only examples and may not apply in every case. For example, in one case the mobile handset may be tested, while no upgrade is occurring. In this case it may not make sense to refer to the mobile handset as a mobile handset that is being upgraded.

In step 260 a response is transmitted from the mobile handset 55. The response is responsive to the request of step 255. It may be a response informing the computer 109 that the upgrade was successful or unsuccessful. In another case, the response may be test data that was requested by the computer 109. In some cases no response may be necessary.

Figure 6:
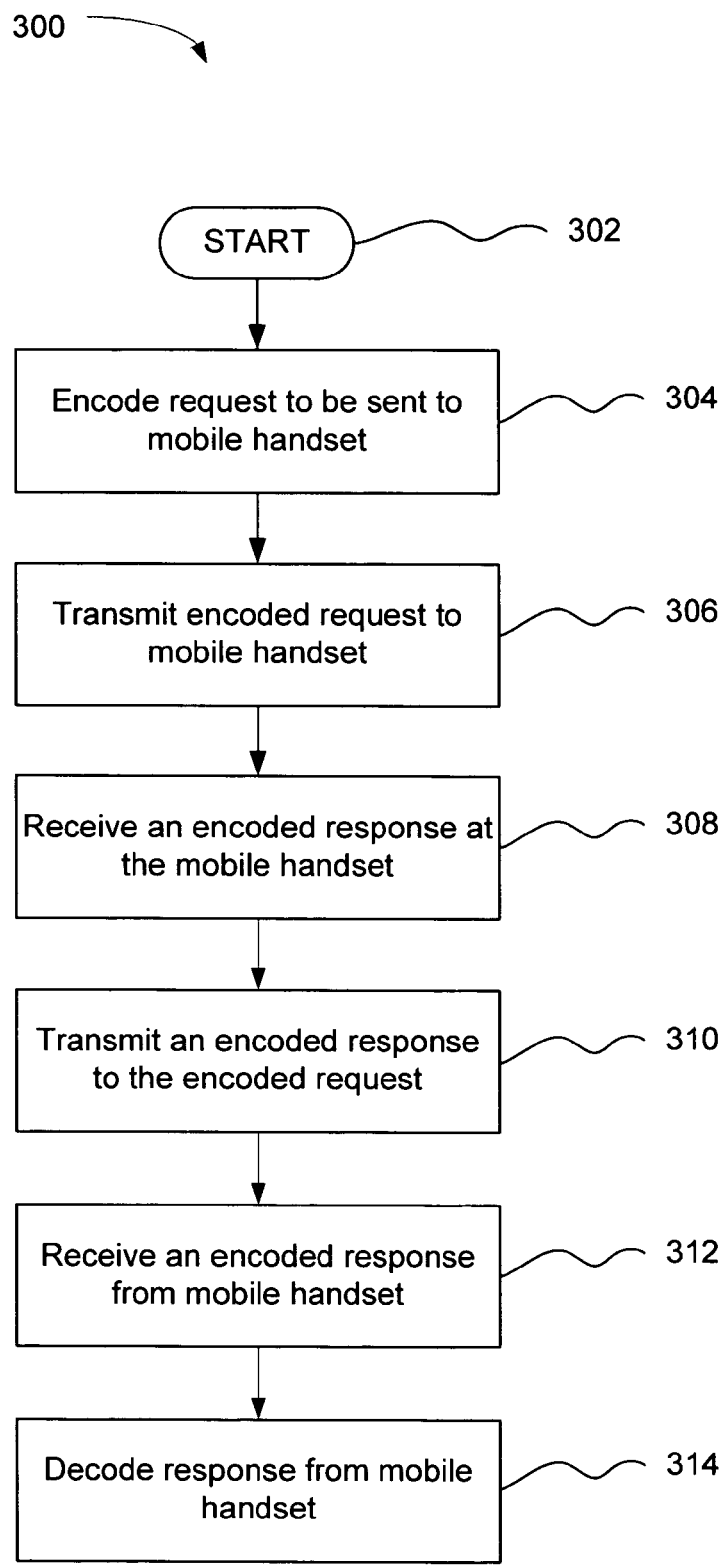
FIG. 6 is a flowchart.

FIG. 6 is a flowchart 300 that shows the steps described with respect to FIGS. 4 and 5. FIG. 6 begins at step 302. In step 304 a request is encoded to be sent to the mobile handset. Step 304 is the same or similar to step 204 of FIG. 4. In step 306 the encoded request is transmitted to the mobile handset. Step 306 is the same or similar to step 206 of FIG. 4. In step 308 the encoded message is received at the mobile handset. Step 308 is the same or similar to step 255 of FIG. 5. Recall that the mobile handset here refers to the mobile handset 55 of FIGS. 1 and 2.

Referring again to FIG. 6 step 310 will now be discussed. In step 310 the mobile handset transmits an encoded message responsive to the encoded request received in step 308. Step 310 is the same or similar to step 260 of FIG. 5. In step 312 an encoded response is received from the mobile handset. Step 312 is the same or similar to step 210 of FIG. 4. The encoded response is decoded in step 314. Step 314 is the same or similar to step 215 of FIG. 4.

Figure 7:
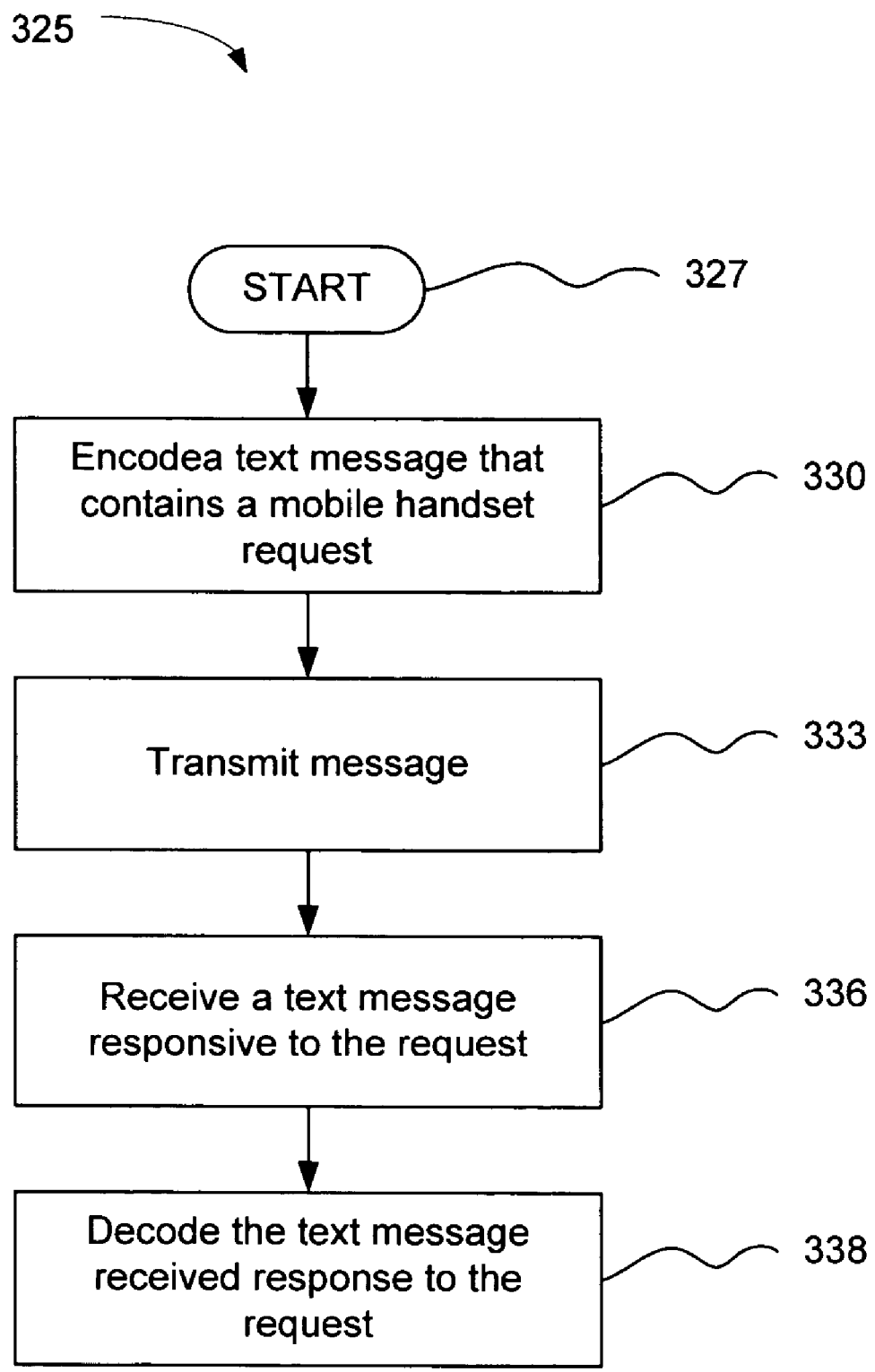
FIG. 7 is a flowchart.

Referring now to FIG. 7 a flowchart 325 will be described. The flowchart 325 is from the perspective of a device transmitting to a mobile handset and begins at step 327. At step 330 a text message that contains a mobile handset request is encoded. Step 327 is similar to step 204 of FIG. 4 and step 304 of FIG. 6. The encoded message may request data from the phone. Alternatively, the request may instruct the mobile handset to perform some function. The message is transmitted in step 333. Step 333 is similar to step 206 of FIG. 4 and step 306 of FIG. 6. In some cases, the mobile telephone may reply with a text message responsive to the request. In step 336 a text message responsive to the request is received. Step 336 is similar to step 210 of FIG. 4 and step 312 of FIG. 6. The response is decoded in step 338. Step 338 is similar to step 215 of FIG. 4 and step 314 of FIG. 6. As shown, data from a mobile handset can be collected without connecting a cable to the mobile handset.

Figure 8:
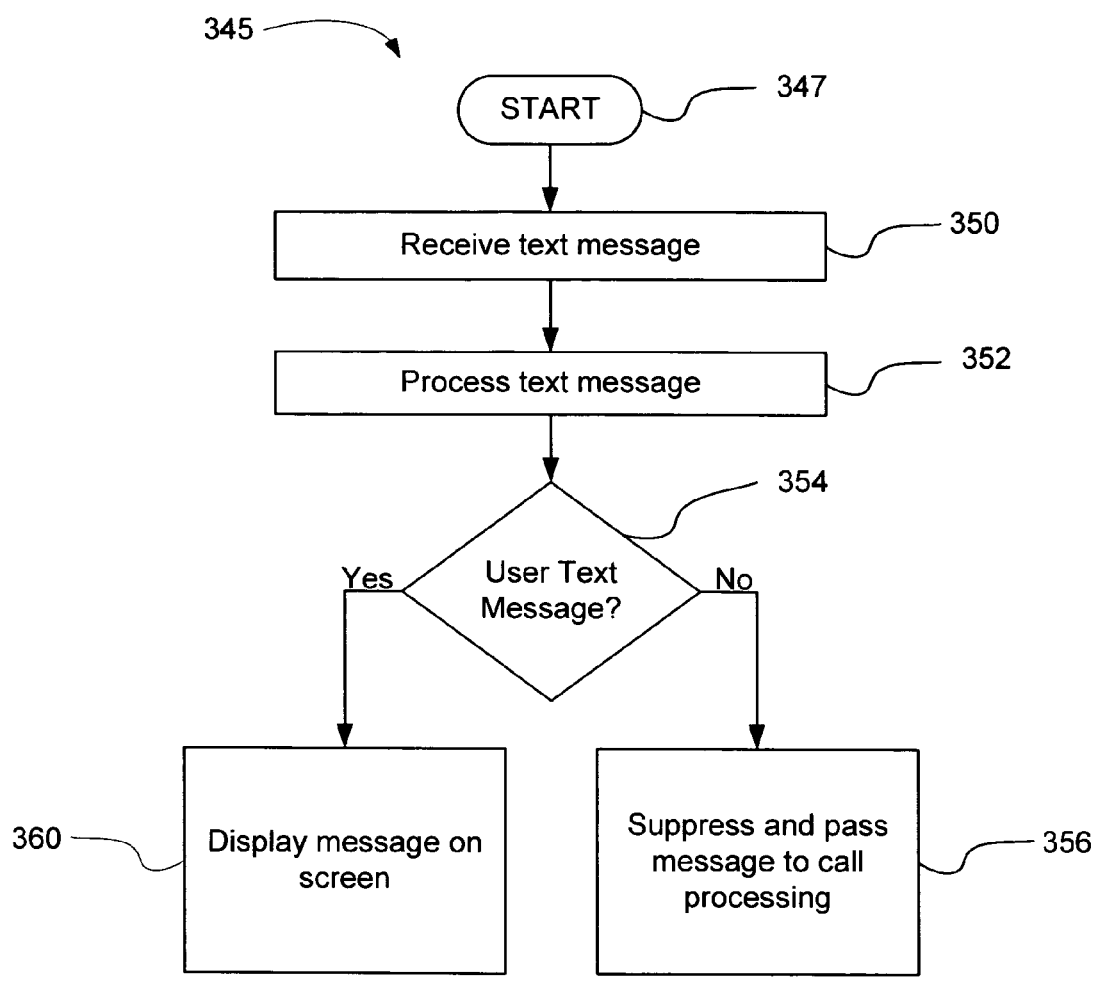
FIG. 8 is a flowchart.

Referring now to FIG. 8, a flowchart 345 from the perspective of a mobile handset is shown and described. The flowchart begins at step 347. A text message is received at step 350. Step 350 is similar to step 255 of FIG. 5. The text message is processed in step 352. Step 352 is similar to step 260 of FIG. 5.

In step 354 a decision is made. If the text message is user text the flowchart proceeds to step 360 and the text message is displayed on the screen of the mobile handset. Alternatively, if the text message is a request, the display step is suppressed and the message is passed to call processing in step 356.

Figure 9:
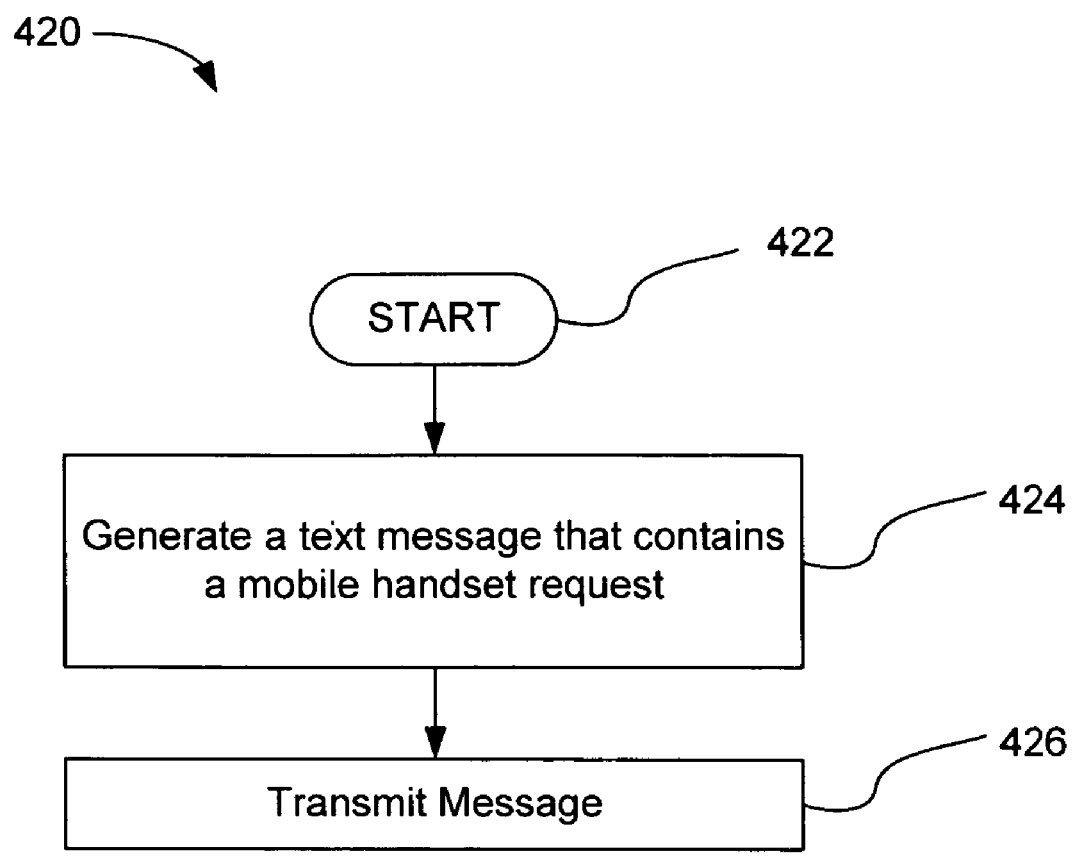
FIG. 9 is a flowchart.

An electronic device such as a base station may be used to transmit a text message containing a mobile handset request. A flowchart 420 is shown in FIG. 9. The flowchart 420 begins at step 422. A text message that contains a mobile handset request is received in step 424. The message may be received by a base station or otter electronic device. The text message is then transmitted in step 426. The transmission may include transmission over-the-air. Alternatively, the transmission may include transmission over land telephone lines. Additionally, the transmission step may include, but are not limited to, mobile handset transmissions such as cellular, PCS, and AMPS. Other forms of transmission are also possible, including satellite and microwave. Step 426 may be a transmission step directly to a mobile handset, however, alternately, the transmission may be an intermediate step.

Figure 10:
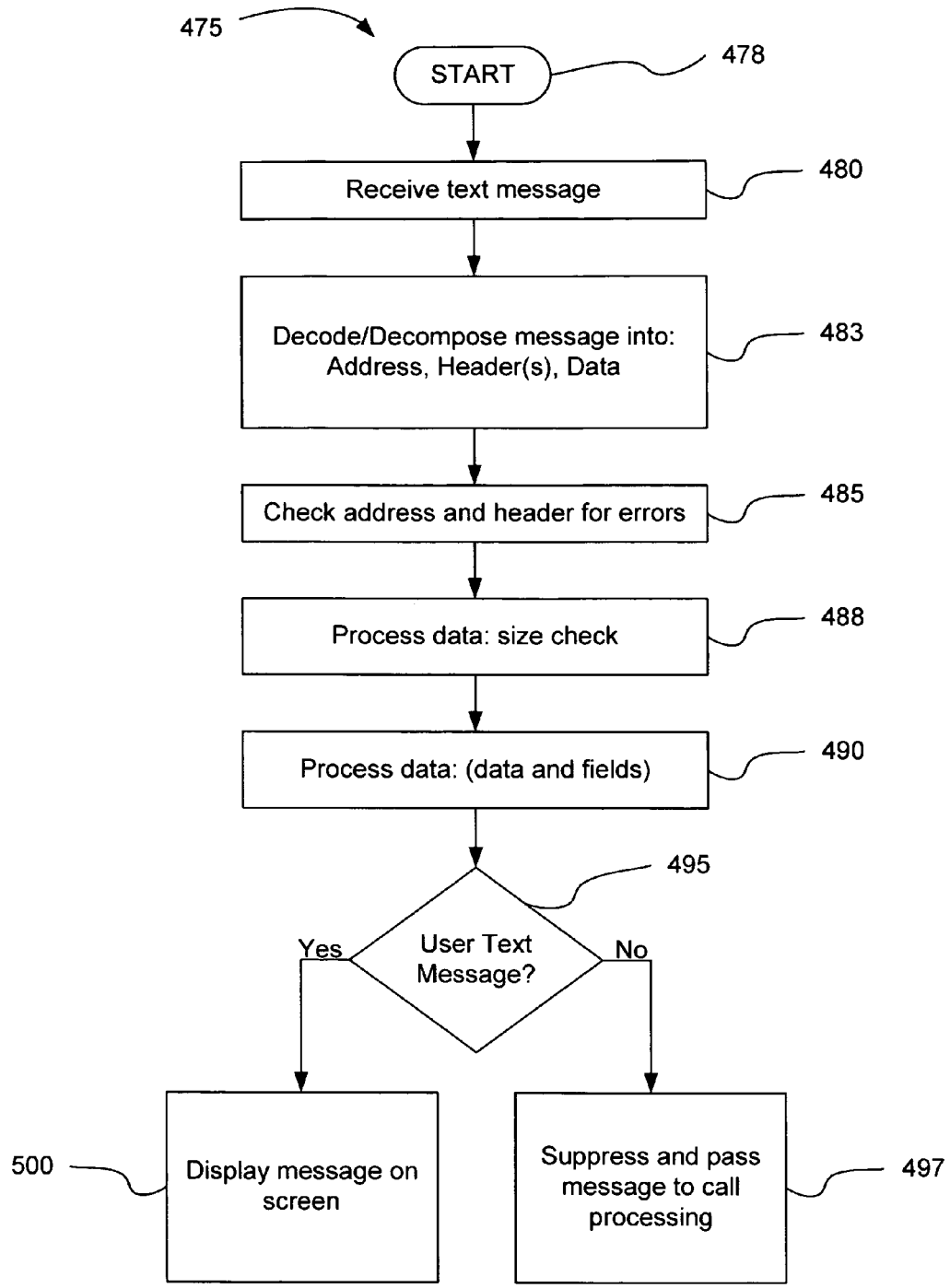
FIG. 10 is a flowchart.
Figure 11:
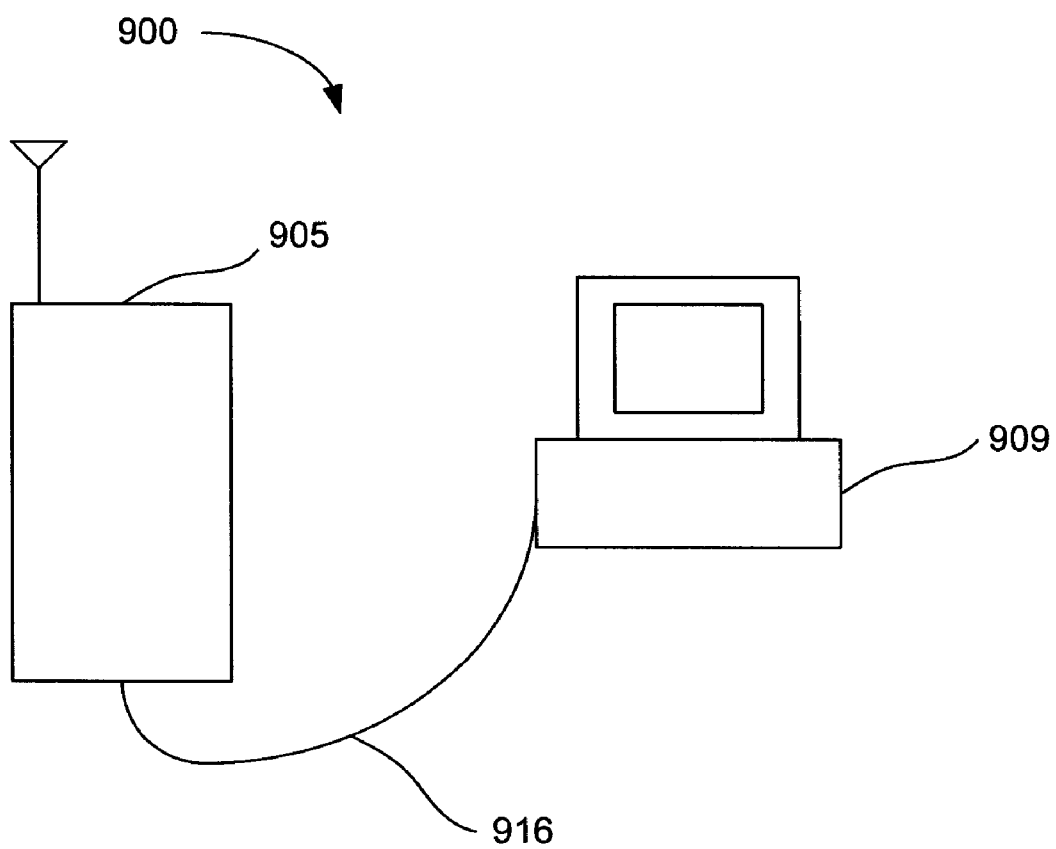
FIG. 11 is a diagram showing prior art.

Referring now to FIG. 10, a flowchart 475 is shown. The flowchart 475 shows more possible detail of the flowchart 345 of FIG. 8. Not all steps of the flowchart 475 are required. The flowchart 475 of FIG. 10 begins at step 478. In step 480 a text message is received. Step 480 is the same or similar to step 350 of FIG. 8. Steps 483, 485, 488, and 490 of FIG. 10 are possible text message process steps. Recall that in step 352 of FIG. 8 the text message is processed.

The examples described above are intended to be illustrative only. Other examples are possible. The scope should only be limited by the claims. As discussed above other devices may take the place of the computer 109, cable 107, mobile handset 105 combination discussed with respect to FIG. 2. Additionally, the mobile handset 105 and the mobile handset 55 of may be the same or similar, however, they may alternately, be much different. Additionally, the mobile handset that is being communicated with over-the-air may be the same or similar to the mobile handset 55, however, the test setup 117 may be capable of testing mobile handsets or other mobile communication devices that are not the same as the mobile handset 55.

We claim:

1. A method of remote debugging a first mobile handset comprising:
    encoding a status request generated from a second mobile handset that is communicated to the first mobile handset;
    transmitting the encoded status request to the mobile handset from the second mobile handset, wherein the encoded status request is transmitted in the form of a Short Message Service (SMS) text message;
    receiving the encoded status request at the first mobile handset;
    decoding the encoded status request at the first mobile handset;
    processing the decoded status request at the first mobile handset;
    suppress displaying the SMS text message on the first mobile handset based on the determination that the text message comprises a status request;
    encoding a message responsive to the status request at the first mobile handset in the form of a responsive SMS text message;
    transmitting the encoded message from the first mobile handset to the second mobile handset;
    receiving an encoded SMS response at the second mobile handset that is communicated by the first mobile handset; and
    decoding the encoded SMS response that is communicated by the first mobile handset at the second mobile handset.

2. The method of claim 1 wherein the status request is for mobile handset performance statistics.

3. The method of claim 1 wherein the status request is for a mobile handset error log.

4. The method of claim 1 wherein the status request is for mobile power source performance information.

5. The mobile handset of claim 1 wherein the status request is to re-initialize a mobile handset performance statistic.

6. The method of claim 1 wherein the status request is to re-initialize a mobile handset error log.

7. The method of claim 1 further comprising:
   determining that the SMS text message contains a request; and
   suppress displaying the text message based on the determination.

8. The method of claim 7 wherein the suppress displaying the SMS text message further comprises sending the text message to call processing.

9. The method of claim 7 wherein the SMS text message further comprises a flag bit indicative of a request.

10. The method of claim 7 wherein the processing step further comprises:
   decoding the SMS text message into address, header, and date;
   checking the header for errors;
   processing the data by performing a size check; and
   processing the data by checking the data and fields for information indicative of a mobile handset request.

11. A method of remote debugging a first mobile handset comprising:
   encoding a Short Message Service (SMS) text message generated from a second mobile handset that contains a status request;
   transmitting the SMS text message from the second mobile handset to the first mobile handset;
   receiving the SMS text message at the first mobile handset;
   decoding the SMS text message at the first mobile handset;
   processing the status request at the first mobile handset;
   suppress displaying the SMS text message on the first mobile handset based on the determination that the text message comprises a status request; and
   receiving a message responsive to the status request at the second mobile handset.

12. The method of claim 11 wherein encoding the SMS text message step includes setting a flag bit in the text message that is indicative that the text message corresponds the status request.

13. The method of claim 11 wherein the SMS text message is base-64.

14. A method of remote debugging a first mobile telephone handset comprising:
   receiving a Short Message Service (SMS) text message generated from a second mobile handset at the first mobile handset;
   processing the SMS text message at the first mobile handset;
   determining that the SMS text message comprises a status request at the first mobile handset; and
   suppress displaying the SMS text message on the first mobile handset based on the determination that the text message comprises the status request; and
   receiving a message responsive to the status request at the second mobile handset.

15. The method of claim 14 wherein the suppress step further comprises sending the SMS text message to call processing.

16. The method of claim 14 wherein the SMS text message includes a flag bit indicative of a request.

17. The method of claim 14 wherein the processing step includes:
   decoding the SMS text message into address, header, and date;
   checking the header for errors;
   processing the data by performing a size check; and
   processing the data by checking the data and fields for information indicative of a mobile handset request.

18. A method of remote debugging a first mobile telephone handset comprising:
   receiving a Short Message Service (SMS) text message generated from a second mobile handset that contains an encoded status request at a base station;
   transmitting the SMS text message from the base station;
   receiving the SMS text message at the first mobile handset;
   decoding the status request corresponding to the SMS text message at the first mobile handset;
   processing the status request at the first mobile handset;
   suppress displaying the SMS text message on the first mobile handset based on the determination that the text message comprises a status request; and
   receiving a message responsive to the status request at the second mobile handset.

19. The method of claim 18 further comprising encoding a SMS message responsive to the status request at the mobile handset and transmitting the encoded SMS message from the mobile handset.

20. The method of claim 19 further comprising receiving an encoded SMS response that is communicated by the mobile handset and decoding the encoded SMS response that is communicated by the mobile handset.

21. The method of claim 18 wherein the SMS text message includes a flag bit.

* * * * *